United States Patent [19]

Amada et al.

[11] Patent Number: 5,189,564
[45] Date of Patent: Feb. 23, 1993

[54] MAGNETIC RECORDING/REPRODUCING METHOD AND APPARATUS

[76] Inventors: Nobutaka Amada, Hitachi-Hachimanyama Apt.-552, 1545 Yoshida-cho; Takaharu Noguchi, Totsuka-Highrise 135, 884-1 Kamikurata-cho, both of Totsuka-ku, Yokohama-shi; Hiroyuki Kimura, 1-12-1725, Yurigaoka, Ninomiya-cho, Naka-gun, Kanagawa-ken; Masaharu Kobayashi, Hitachi-Hachimanyama Apt.-331, 1545 Yoshida-cho, Totsuka-ku, Yokohama-shi; Takao Arai, 65-24 Ibukino, Midori-ku, Yokohama-shi, Kanagawa-ken; Yasufumi Yumde, 1257-1, Yoshida-cho, Totsuka-ku, Yokohama-shi, Kanagawa-ken; Kuniaki Miura, 3173-1 Godai, Naka-cho, Naka-gun, Ibaraki-ken, all of Japan

[21] Appl. No.: 321,778

[22] Filed: Mar. 10, 1989

Related U.S. Application Data

[63] Continuation of Ser. No. 872,902, Jun. 11, 1986, abandoned.

[30] Foreign Application Priority Data

Jun. 21, 1985 [JP] Japan .................. 60-134054
Jun. 21, 1985 [JP] Japan .................. 60-134057

[51] Int. Cl.$^5$ .............................................. G11B 5/09
[52] U.S. Cl. ....................................... 360/32; 360/19.1

[58] Field of Search ............... 360/29, 30, 32, 19.1; 375/37, 52, 53, 120; 329/310, 309, 303; 332/103; 358/330, 343

[56] References Cited

U.S. PATENT DOCUMENTS

| | | | |
|---|---|---|---|
| 4,281,412 | 7/1981 | Wissel et al. ............... | 375/120 X |
| 4,501,002 | 2/1985 | Auchtorlonie ............... | 329/309 X |
| 4,596,022 | 6/1986 | Stoner ....................... | 329/303 X |
| 4,613,976 | 9/1986 | Serverinson et al. ....... | 375/52 X |
| 4,758,903 | 7/1988 | Noguchi ..................... | 360/30 X |

FOREIGN PATENT DOCUMENTS

0134563 10/1980 Japan ............................ 375/54

OTHER PUBLICATIONS

Miura et al. IEEE Transactions on Consumer Electronics "HiFi VCR System" vol. CE-30 No. 3 Aug. 1984 pp. 360-368.

*Primary Examiner*—Aristotelis Psitos
*Assistant Examiner*—Joseph P. Kraynak, Jr.
*Attorney, Agent, or Firm*—Antonelli, Terry, Stout & Kraus

[57] ABSTRACT

In an information recording/reproducing apparatus for recording/reproducing a digital audio signal on/from a magnetic medium, a modulator/demodulator for modulating/demodulating the digital signal by offset quadrature phrase shift keying (O-QPSK). This technique is particularly applicable to the multi-layer recording of video and audio signals in a video tape recording/reproducing system and has the advantage of avoiding interference between the recorded digital audio and video signals at the time of reproduction.

31 Claims, 9 Drawing Sheets

⟨i⟩ MOD. SIDE

⟨ii⟩ DEMOD. SIDE, $\phi = 0°(180°)$

⟨iii⟩ DEMOD. SIDE, $\phi = 90°(-90°)$

(F) 
$P_0(\bar{P}_0)$ $P_1(\bar{P}_1)$ $P_2(\bar{P}_2)$ (G) 
$Q_{-1}(\bar{Q}_{-1})$ $Q_0(\bar{Q}_0)$ $Q_1(\bar{Q}_1)$ $Q_2(\bar{Q}_2)$ (H) 
$X_0$ $X_1$ $X_2$ (I) 
$Y_{-1}$ $Y_0$ $Y_1$ $Y_2$

MAGNETIC RECORDING/REPRODUCING METHOD AND APPARATUS

CROSS-REFERENCE TO RELATED APPLICATION

This application is a continuation of our prior copending U.S. application Ser. No. 872,902, filed Jun. 11, 1986, now abandoned.

BACKGROUND OF THE INVENTION

The present invention relates in general to a method and apparatus for magnetic recording/reproducing, and more particularly, to the digitization of audio signals for a video tape recorder (VTR) using a selected type of modulation and depth recording to avoid interference between the audio and video signals being recorded.

It is known to use a multi-layer recording method for recording video and audio signals in a VTR system. In this regard, attention is directed to the IEEE Transactions on Consumer Electronics, Vol. CE-30, No. 3, August 1984, pgs. 360–369, by Miura et al. As apparent from FIGS. 1 and 2 of this technical paper, a video signal is recorded on a surface part of the magnetic layer and the FM audio signal is recorded on a deep part thereof by separate video and audio heads, each of which has an azimuth angle different from the other. In the reproducing mode the video signal and the FM audio signal are separately reproduced with the help of the azimuth loss effect. However, both signals are recorded on the magnetic medium as analog signals in the Miura et al. system.

Various efforts have been made over the years to effect the recording of both of the video and audio signals on magnetic tape as digital signals. These efforts are directed to the possibility of video and audio signals on a magnetic tape comparable in size to the standard audio cassette. However, in order to superimpose the digital audio signal and the video signal, it is necessary to avoid interference between these signals, including interference resulting from the digital nature of the audio signal. In this regard, the spectrum of the digital audio base-band signal is such that, even if it is superimposed with the video signal by using the azimuth loss effect, it becomes impossible to separate the down-converted chrominance signal, if conventional base-band modulation of the digital audio signal is employed.

In the field of digital radio communication, a quadrature differential phase-shift keying (QDPSK) system is widely employed today due to some advantages including the capability of relatively narrow band transmission and the simplified structure of the demodulator. In such QDPSK system, however, passage of information through a non-linear channel causes an increase in the bandwidth and deteriorates the coding error rate characteristic. These disadvantages raise a serious problem to be solved in a transmitter for satellite communication, mobile communication or the like, where the bandwidth is limited and the carrier-to-noise power ratio (C/N) is not settable to be so high.

In view of the circumstances mentioned above, an offset QPSK system is attracting attention of late. This system is dealt with in the following: H. Suzuki et al., "Fundamental Properties of Narrowband Digital Angle Modulations", Shingaku Giho, CS-81-52, 1981; and R. K. Kwan, "The Effects of Filtering and Limiting a Double Binary PSK Signal", IEEE Trans. on AES, July 1986. According to this system, data of an in-phase (P) channel and a quadrature (Q) channel are modulated in such a manner that the code change points thereof have a mutual deviation of one half data period, wherein the envelopes of the modulated waves are rendered free from zero-crossing, and the band is not so widened with passage of the data via the non-linear channel. See also the paper by S. A. Rhodes, entitled "Effects of Hard Limiting on Band-Limited Transmissions with Conventional and Offset QPSK Modulation", IEEE National Telecommunication Conference, 1972.

However, it is impossible in such offset QPSK system to use differential coding and decoding employed customarily in the known QPSK system, so that detection of the absolute phase has been necessary on the demodulator side heretofore.

SUMMARY OF THE INVENTION

An object of the invention is to provide information recording and reproducing apparatus equipped with an offset quadrature differential PSK modulator/-demodulator adapted for recording and reproducing digital information.

The present invention provides a magnetic recording/reproducing apparatus which is capable of magnetically recording a video signal and a digital audio signal, wherein the aforesaid offset quadrature differential PSK modulator is used as a modulation means in the digital audio recording line, while the aforesaid offset quadrature differential PSK demodulator is used as a demodulation means in the digital audio reproducing line. In another magnetic recording/reproducing apparatus of the invention, a limiter circuit or a combination of a limiter circuit and a band-pass filter is disposed in a stage posterior to the aforesaid offset quadrature differential PSK modulator in the digital audio recording line.

The above-mentioned magnetic recording/reproducing apparatus for recording video signal and digital audio signal is defined as a multilayer recording and reproducing type which is capable of recording the video signal in a surface part of a magnetic recording medium while recording the digital audio signal in a deep part thereof.

The present invention is so contrived that on its modulator side, data of the in-phase channel and the quadrature channel are modulated after differential coding with the respective code change points being deviated from each other by one half data period, while on its demodulator side, the detected data is converted into serial data after differential decoding in the in-phase and quadrature channels.

In the present invention, the offset quadrature differential PSK modulator comprises a first converter for converting input serial digital data into first and second signals which correspond respectively to the even and odd bits of the serial digital data with the code change points thereof having a mutual deviation of one half data period; first and second differential coders for differentially coding the first and second signals respectively; and a quadrature modulator for balanced-modulating two quadrature carriers having a $\pi/2$ phase difference from each other by the outputs of the first and second differential coders.

Meanwhile, the offset quadrature differential PSK demodulator of the present invention comprises a coherent detector for receiving the signal transmitted from the aforesaid offset quadrature differential PSK modulator and phase-detecting the received signal with two quadrature carriers having a $\pi/2$ phase difference from each other; first and second code discriminators for discriminating between positive and negative polarities of the first and second output signals from the coherent detector, and for converting such signals into first and second digital signals respectively; first and second differential decoders for differential decoding the first and second digital signals respectively; and a second converter for alternately selecting the output signals of the first and second differential decoders at a speed twice the data speed of such output signals and converting them into serial signals.

The differential coding executed by the first and second differential coders constituting the offset quadrature differential PSK modulator is preferably such as to satisfy the conditions of Eqs. (1) and (2) which will be described later in detail. And similarly the differential decoding executed by the offset quadrature differential PSK demodulator is preferably such as to satisfy the conditions of Eqs. (6) and (7) or Eqs. (8) and (9) which will also be described later in detail.

DETAILED DESCRIPTION OF THE PREFERRED EMBODIMENTS

Figure 1A:
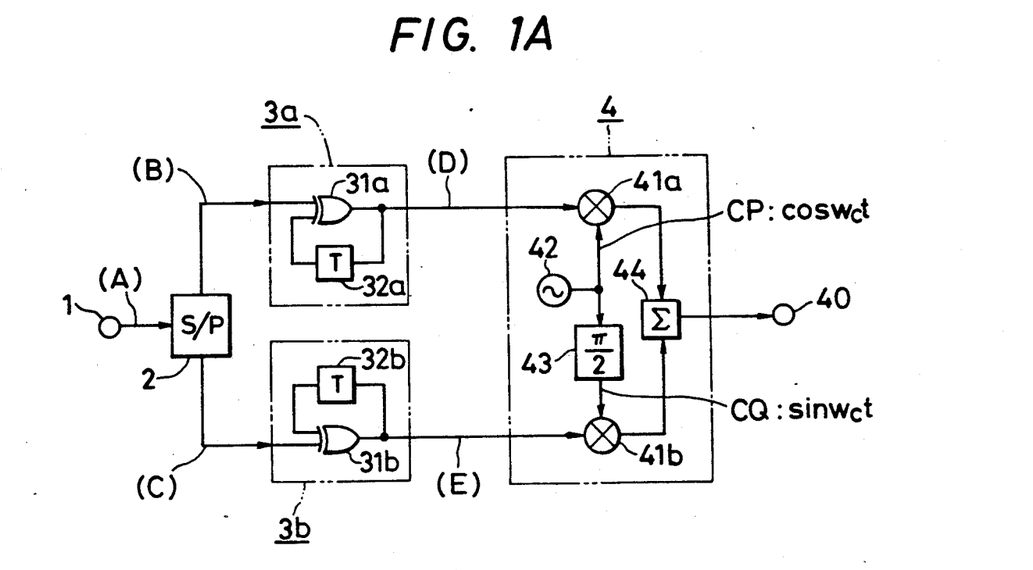
FIG. 1A is a circuit diagram showing an embodiment of the offset quadrature differential PSK modulator according to the present invention.
Figure 1B:
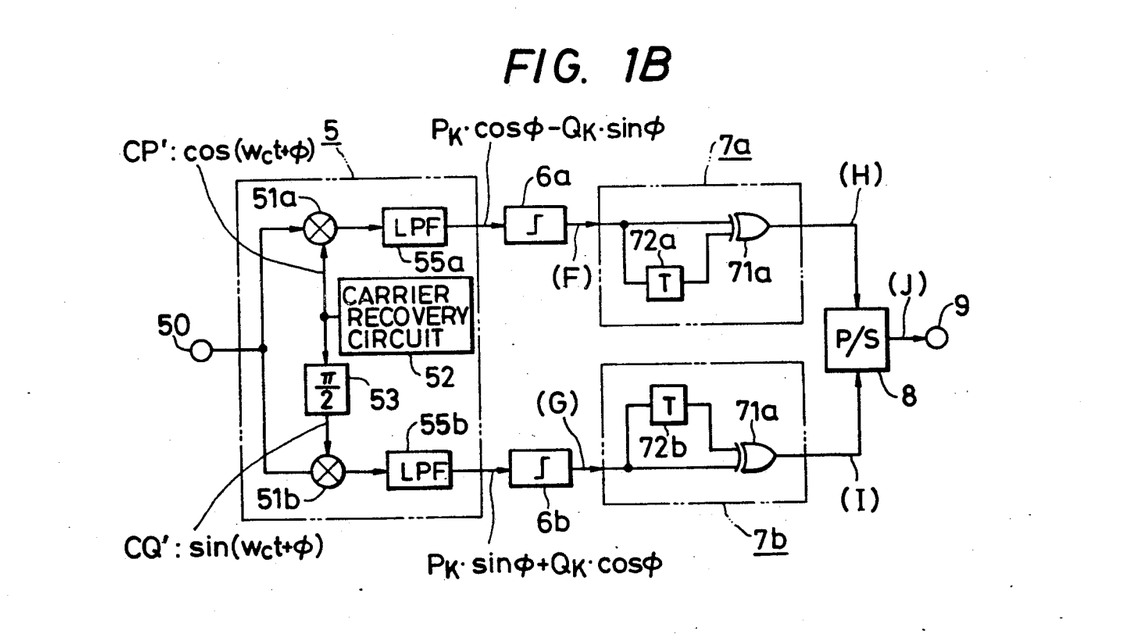
FIG. 1B is a circuit diagram showing an embodiment of the offset quadrature differential PSK demodulator according to the invention.

FIGS. 1A and 1B are respective circuit diagrams of a modulator and a demodulator for offset quadrature differential PSK embodying the present invention.

First in FIG. 1A, there are shown an input terminal 1 for digital data (A) to be transmitted; a serial-parallel converter circuit 2 for converting the input serial data (A) into parallel data (B) and (C) of two systems; differential coders 3a and 3b for converting the codes of parallel data (B) and (C) into coded changes; a quadrature modulator 4 for balance-modulating, by two carriers having a $\pi/2$ phase difference from each other, the parallel data (D) and (E) differentially coded independently of each other; and an output terminal 40 for the modulated signal. In the above, the differential coder 3a comprises an EOR circuit 31a and a delay circuit 32a, while the differential coder 3b comprises an EOR circuit 31b and a delay circuit 32b. And the quadrature modulator 4 comprises balanced modulators 41a and 41b, a carrier oscillator 42, a $\pi/2$ phase shifter 43 and an adder 44. Thus the component elements mentioned constitute an offset quadrature differential PSK (O-QDPSK) modulator.

In FIG. 1B are shown an input terminal 50 for the O-QDPSK modulated signal; a coherent detector 5 for phase-detecting the input modulated signal by two quadrature carriers phase-locked to the modulated signal; code discriminators 6a and 6b for discriminating between the positive and negative polarities of the phase-detected input signals of two systems by the timing synchronized with the speed of the parallel data transmitted thereto, and converting the input signals to digital signals; differential decoders 7a and 7b for inversely converting the respective coded changes of the digital signals (F) and (G) of two systems to the former codes thereof; a parallel-serial converter 8 for converting the decoded parallel data (H) and (I) to serial data (J); and an output terminal 9 for the finally demodulated digital data (J). The coherent detector 5 comprises phase detectors 51a and 51b, a carrier recovery circuit 52, a $\pi/2$ phase shifter 53 and low-pass filters 55a and 55b. And the differential decoder 7a comprises an EOR circuit 71a and a delay circuit 72a, while the differential decoder 7b comprises an EOR circuit 71b and a delay circuit 72b. Thus the component elements mentioned constitute an O-QDPSK demodulator.

Figure 2:
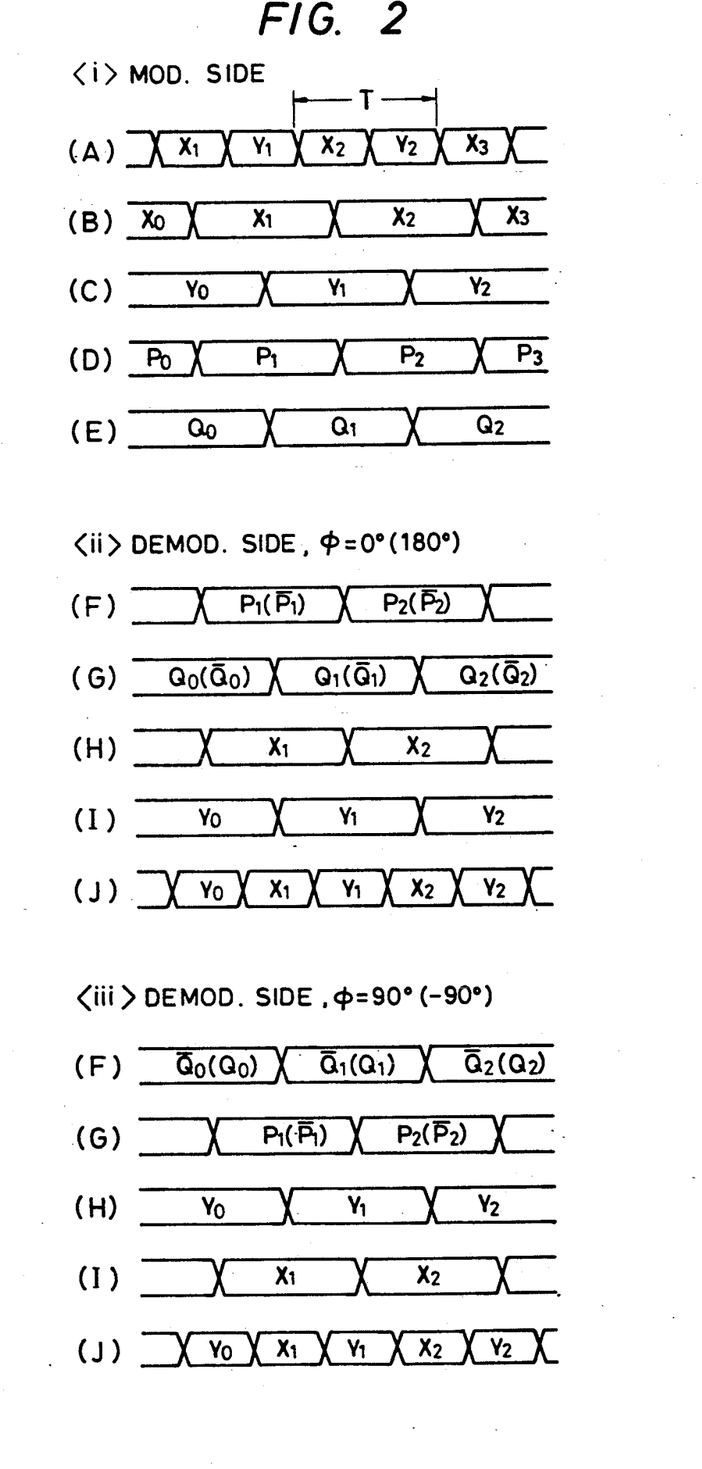
FIG. 2 is a waveform chart illustrating the operations performed in principal portions of the offset quadrature differential PSK modulator and demodulator shown in FIGS. 1A and 1B.

FIG. 2 is a waveform chart illustrating the operations performed in individual portions of the circuit shown in FIG. 1. Hereinafter the operation of this embodiment will be described below with reference thereto.

In FIG. 2, [i] shows operation waveforms on the modulator side, while [ii] and [iii] show those on the demodulator side. The waveforms of [ii] represent a case where the phase difference $\phi$ of the carrier recovered in the demodulator is 0° or 180° with respect to the carrier phase in the modulator, and those of [iii] represent another case where the above phase difference $\phi$ is ±90°. First on the modulator side in [i], the input digital data (A) is divided into 2-bit groups each consisting of a preceding bit Xk and a following bit Yk (in which k is an integer), and the parallel data (B) and (C) converted by the serial-parallel converter 2 are outputted alternately with a mutual deviation of one half data period (T/2) as shown. Subsequently the parallel data Xk and Yk are converted into data Pk and Qk by the differential coders 3a and 3b respectively, as given below by logical expressions:

$$Pk = Xk \oplus Pk-1 \qquad (1)$$

$$Qk = Yk \oplus Qk-1 \qquad (2)$$

where $\oplus$ means exclusive ORed.

The data Pk and Qk thus obtained are modulated by the quadrature modulator 4. The modulated signals are expressed as Eq. (3) below when the in-phase carrier CP is cos $\omega$ct and the quadrature carrier CQ is sin $\omega$ct (in which $\omega$c is the carrier angular frequency).

$$Pk \cdot \cos \omega ct + Qk \cdot \sin \omega ct \qquad (3)$$

Subsequently, on the demodulator side, the modulated signal given by Eq. (3) is detected by the coherent detector 5. In this stage, the detected output signals are expressed as follows when the in-phase carrier CP' and the quadrature carrier CQ' recorded by the circuit 52 are cos ($\omega$ct+$\phi$) and sin ($\omega$ct+$\phi$), respectively.

$$Pk \cdot \cos\phi - Qk \cdot \sin\phi \qquad (4)$$

$$Pk \cdot \sin\phi + Qk \cdot \cos\phi \qquad (5)$$

During the normal operation of the carrier recovery circuit 52, the phase different $\phi$ as compared with the modulator side is a value of 0°, ±90° or ±180°.

FIG. 2 [ii] shows the operation waveforms in a case where such phase different $\phi$ is 0° or 180°. For example, when the phase different $\phi$ is 0°, data Pk and Qk appear in the output signals (F) and (G) of the code discriminators 6a and 6b. Then such data are processed by the differential decoders 7a and 7b, so former parallel data Xk and Yk are decoded in the output signals (H) and (I) respectively. This process is expressed by logical equations as follows:

$$Pk \oplus Pk-1 = (Xk \oplus Pk-1) \oplus Pk-1 = Xk \qquad (6)$$

$$Qk \oplus Qk-1 = (Yk \oplus Qk-1) \oplus Qk-1 = Yk \qquad (7)$$

When the phase different $\phi$ is 180°, data $\overline{Pk}$ and $\overline{Qk}$ appear in the signals (F) and (G) as is obvious from Eqs. (4) and (5), but the former data Xk and Yk are decoded in the signals (H) and (I) by the differential decoders 7a and 7b. The above is expressed by the following logical equations:

$$\overline{Pk} \oplus \overline{Pk-1} = \overline{Xk \oplus Pk-1} \oplus \overline{Pk-1} \qquad (8)$$
$$= Xk \oplus \overline{Pk-1} \oplus \overline{Pk-1}$$
$$= Xk$$

$$\overline{Qk} \oplus \overline{Qk-1} = \overline{Yk \oplus Qk-1} \oplus \overline{Pk-1} \qquad (9)$$
$$= Yk \oplus \overline{Qk-1} \oplus \overline{Qk-1}$$
$$= Yk$$

The former parallel data Xk and Yk thus resumed are converted into serial data by the parallel-serial converter 8 to obtain final demodulated data (J).

Similarly to the above, when the phase difference $\phi$ is 90°, merely the channels relative to Xk and Yk are reversed as shown in FIG. 2 [iii] while the sequential relationship between Xk and Yk is maintained, so that no problem is raised by executing parallel-serial conversion of the data in such order. This method will be described later in detail.

Figure 3:
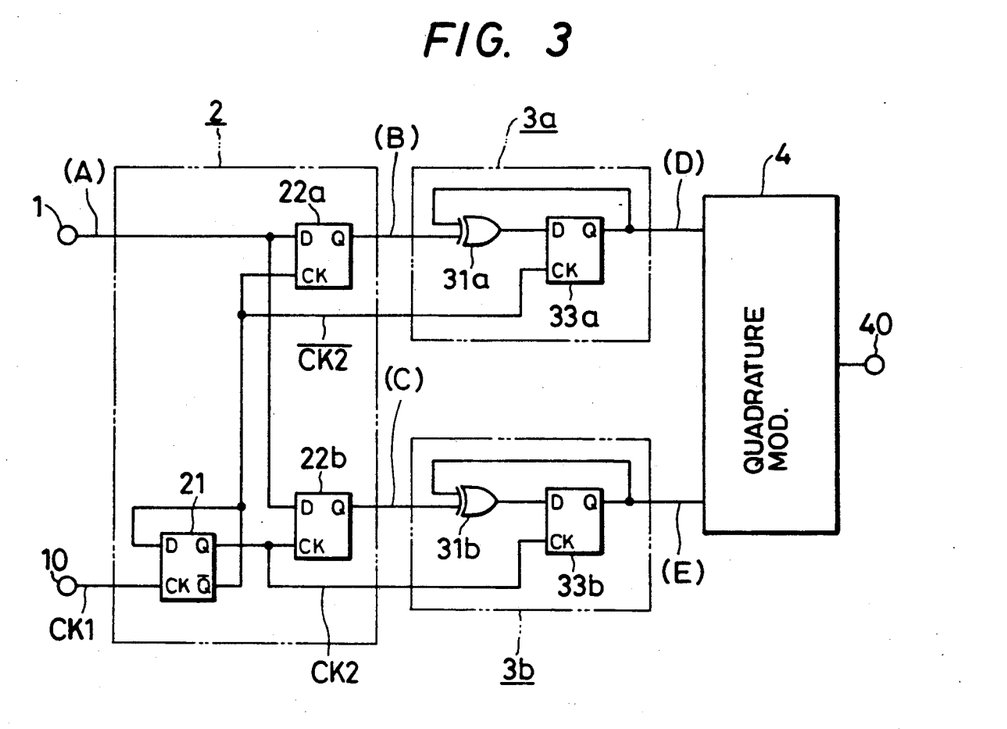
FIG. 3 is a circuit diagram showing an exemplary configuration of principal components of the offset quadrature differential PSK modulator shown in FIG. 1A.
Figure 4:
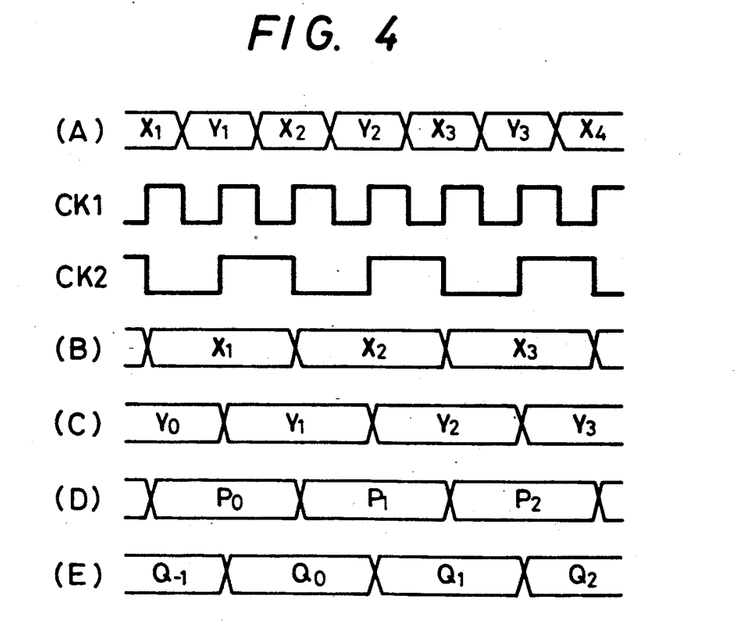
FIG. 4 is a waveform chart illustrating the operations in principal portions of the circuit configuration shown in FIG. 3.

FIG. 3 is an exemplary circuit diagram of the modulator according to the present invention. In this embodiment are shown D-type flip-flops (D-FF) 21, 22a, 22b, 33a, 33b, and an input terminal 10 for clock pulses CK1 of the input data (A). FIG. 4 is a waveform chart showing individual operations performed in the circuit of FIG. 3. Hereinafter such operations will be described with reference to FIG. 4. The clock pulses CK1 fed to the input terminal 10 are frequency-divided by two in the D-FF 21 to produce clock pulses CK2 and $\overline{CK2}$. The input serial data (A) is latched by the D-FF 22a and 22b synchronously with the rising edges of the clock pulses CK2 and $\overline{CK2}$, whereby parallel data Xi and Yi are obtained. In the differential coders 3a and 3b, D-FF 33a and 33b are employed to constitute the delay circuits 32a and 32b shown in the embodiment of FIG. 1, and the operations thereof remain exactly the same. In the circuit configuration of FIG. 3, Pk and Qk are outputted with a delay of one period from Xk and Yk respectively as shown in FIG. 4, but there arises no problem at all. The parallel data Pk and Qk thus coded differentially are modulated by the quadrature modulator 4. According to this embodiment, in the manner mentioned above, the O-QDPSK modulator can be realized with a simplified constitution.

Figure 5:
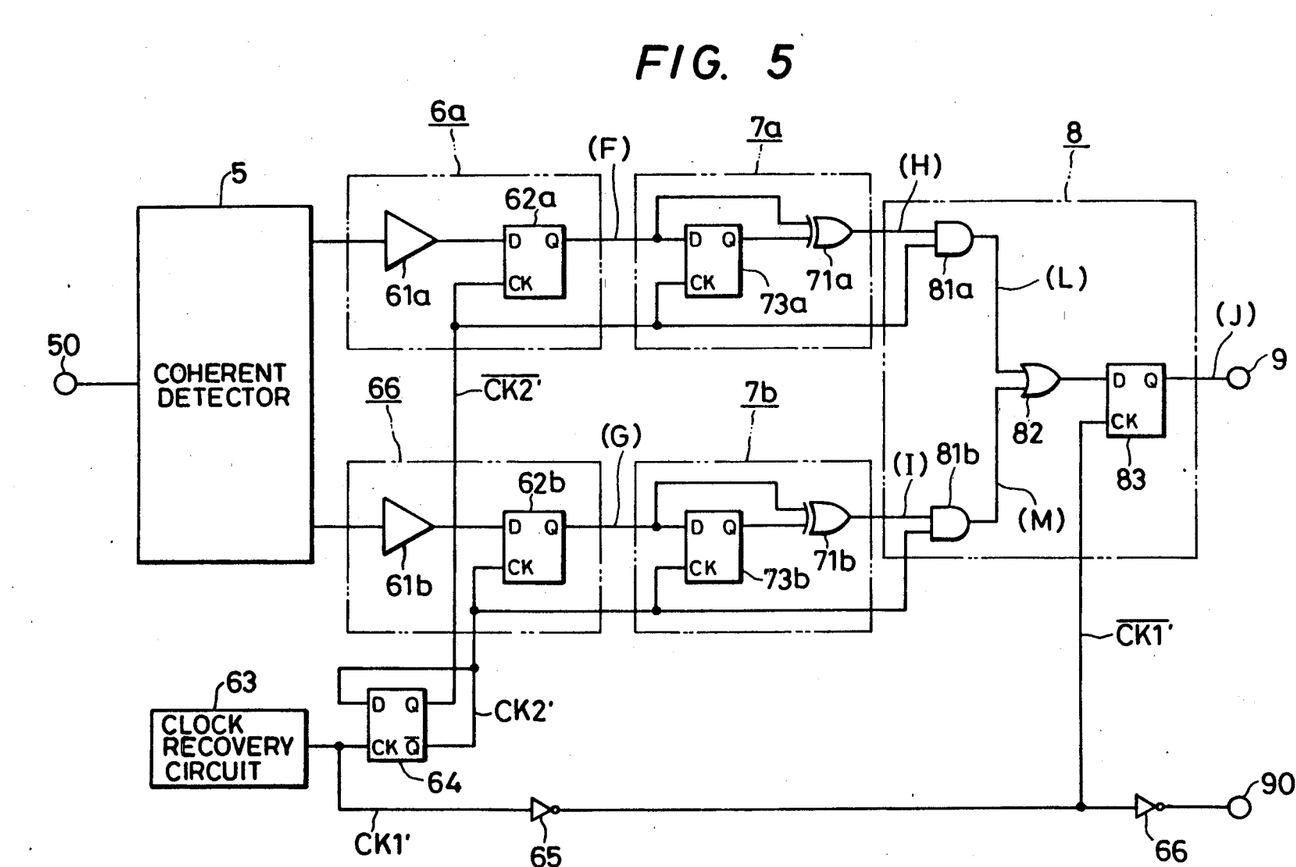
FIG. 5 is a circuit diagram showing an exemplary configuration of principal components of the offset quadrature differential PSK demodulator shown in FIG. 1B.

FIG. 5 is an exemplary circuit diagram of the demodulator according to the present invention. In this embodiment are shown comparators 61a and 61b; D-FF 62a, 62b, 64, 73a, 73b and 83; a clock recovery circuit 63; inverter circuits 65 and 66; AND circuits 81a and 81b; an OR circuit 82; and an output terminal 90 for lock pulses CK1' bit-synchronized with the demodulated data (J). The signals of two systems detected by the coherent detector 5 are converted into digital signals (F) and (G) by the code discriminators 6a and 6b which are composed respectively of comparators 61a, 61b and D-FF 62a, 62b. Such conversion is executed synchronously with the rising edges of clock pulses $\overline{CK2}$ and CK' which are obtained from the D-FF 64 through ½ frequency division of the clock pulses CK1' recovered by the clock recovery circuit 63. The differential decoders 7a and 7b are so constituted that the aforesaid delay circuits 72a and 72b in the embodiment of FIG. 1 are replaced with D-FF 73a and 73b, and the operations thereof remain exactly the same. The decoded parallel data (H) and (J) and the recovered clock pulses CK2' and CK2' are inputted respectively to the AND circuits 81a and 81b, from which AND outputs are produced. The two signals (L) and (M) are fed to the OR circuit 82 to be logically summed and then are latched by the D-FF 83 synchronously with the rising edges of the recovered clock pulse $\overline{CK'}$, whereby demodulated serial data is finally obtained.

Figure 6:
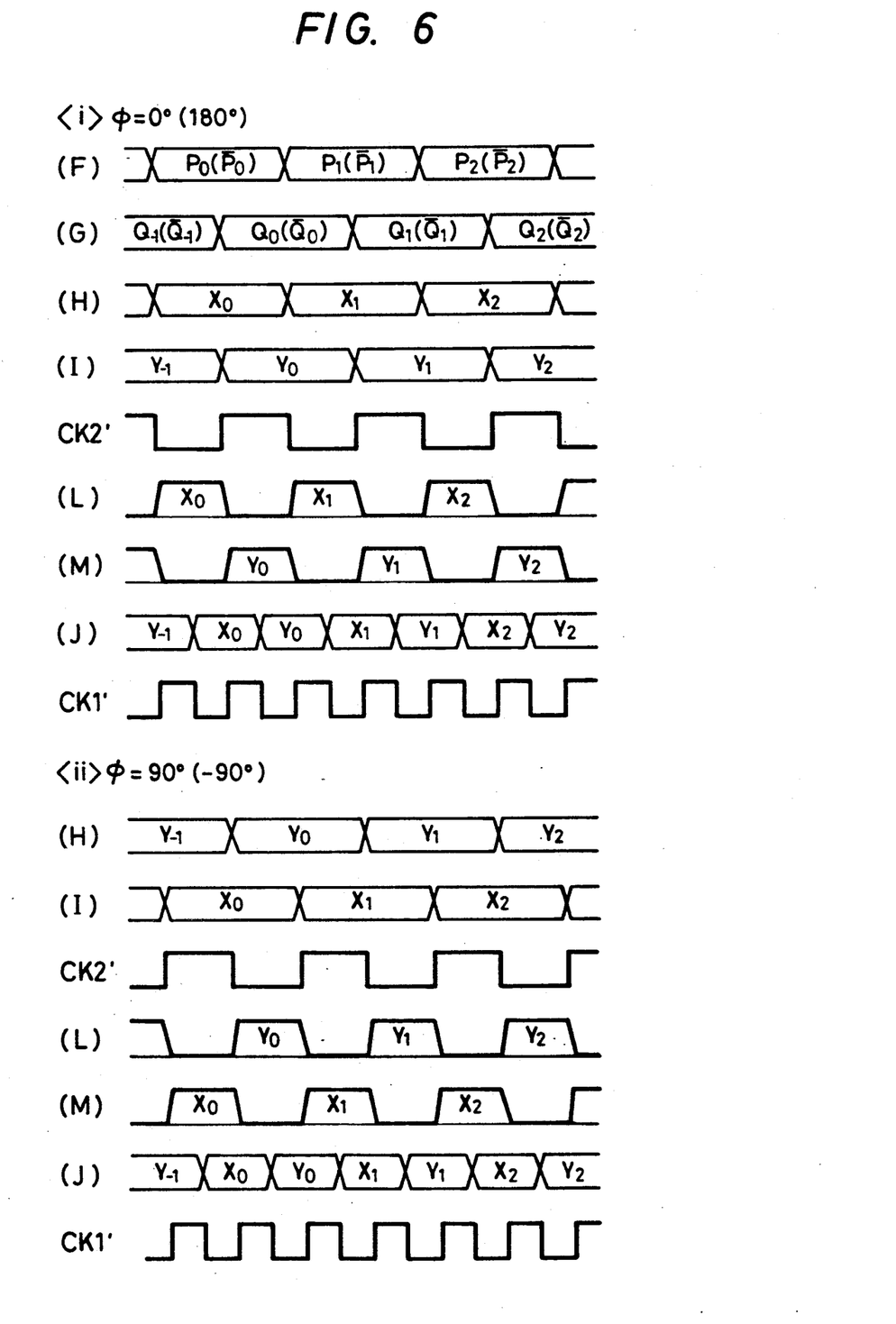
FIG. 6 is a waveform chart illustrating the operatings in principal portions of the circuit configuration shown in FIG. 4.

FIG. 6 is a waveform chart showing how such operations are performed, in which [i] represents a case where the phase different $\phi$ of the recovered carrier is 0° or 180°, and [ii] represents another case the above phase different $\phi$ is ±90°. Thus, regardless of the value of such phase difference $\phi$, the transmitted data can be demodulated without any error.

The differential procedure is applicable also to the O-QPSK system which is advantageous with respect to the non-linear transmission path, so that it becomes unnecessary to detect the absolute phase or to maintain the phase different $\phi$ of the recovered carrier at 0° under control, thereby achieving great effects in simplifying the demodulator circuit configuration.

Now, with reference to FIG. 7, a description will be given on another embodiment where the O-QDPSK system of this invention is applied to a PCM audio magnetic multilayer recording/reproducing apparatus. In the diagram are shown a video input terminal 101; a low-pass filter (LPF) 110 for separating a luminance signal; a frequency modulator 111 for modulating the luminance signal; a band-pass filter (BPF) 112 for separating a chrominance signal; a frequency converter 113 for converting the chrominance signal to a lower frequency; an adder 114 for adding the frequency-modulated luminance signal and the frequency-converted chrominance signal to each other; a recording lamp 115; video signal recording/reproducing heads 116a and 116b; an audio signal input terminal 102; an A/D converter 120; a digital processing circuit 121; an offset quadrature differential phase-shift keying (O-QDPSK) modulator 122; a band-pass filter (BPF) 123; a limiter 124; a recording amplifier 125; audio-only recording/reproducing heads 126a and 126b; a reproducing amplifier 130; a band-pass filter (BPF) 131 for separating the luminance signal; a frequency modulator 132; a low-pass filter (LPF) 133 for separating the chrominance signal; a frequency converter 134; an adder 135 for adding the luminance signal and the chrominance signal to each other; a video signal output terminal 103; a reproducing amplifier 140; a band-pass filter (BPF) 141 for separating the audio signal; an O-QDPSK demodulator 142 of the present invention; a digital processing circuit 143; a D/A converter 144; and an audio signal output terminal 104. The O-QDPSK modulator 122 and the O-QDPSK demodulator 142 may be formed by using the circuit configurations shown in FIGS. 3 and 5, respectively.

In the above constitution, the operation is performed in the following manner. The video signal passed through the LPF 110 and the BPF 112 is separated into the luminance signal and the chrominance signal, which are then frequency-modulated and frequency-converted to the bands of FIG. 8 respectively by the frequency modulator 111 and the frequency converter 113. The signals thus processed are recorded on a tape by the two video recording heads 116a and 116b disposed opposite to each other. And in a playback mode, the signal reproduced by the heads 116a and 116b is passed through the BPF 131 and LPF 133 for separation of the luminance signal and the chrominance signal, which are then processed through the frequency demodulator 132 and the frequency converter 134 respectively, so that the signals are reconverted into the former video frequency band prior to the recording mode and subsequently are fed to the adder 135 from which the original video signal is resumed.

Meanwhile, the audio signal is once converted into a digital form by the A/D converter 120, and a synchronous signal and a correction code are added thereto by the digital processing circuit 121. After interleaving, the digital audio signal is inputted to the O-QDPSK modulator 122, where O-QDPSK modulation is performed in such a manner that, as shown in FIG. 8, the spectrum of the audio signal is defined within the occupied bandwidth of the frequency-converted chrominance signal and that of the frequency-modulated luminance signal in the entire spectrum of the signal to be recorded. The O-QDPSK modulated signal is then passed through the BPF 123 and the limiter 124 so that both the bandwidth and the amplitude are limited, and subsequently the signal is recorded, prior to video recording, on a video track by means of the audio-only heads 126a and 126b which are different in azimuth angle from the video heads 116a and 116b. The O-QDPSK modulated signal thus recorded is erased in the surface part of the tape by the video signal which is recorded later, whereby a multilayer magnetic recording mode is carried out with the first-recorded audio signal remaining in the deep part of the tape.

In a playback mode, the signal reproduced by the audio-only heads 126a and 126b is passed through the BPF 141, from which the modulated audio signal is obtained. This signal is then fed to the O-QDPSK demodulator 142 and the digital processing circuit 143 to resume the former digital signal, which is further fed to the D/A converter 144 to restore the original audio signal.

By recording the audio signal after conversion into a digital form as mentioned above, it is rendered possible to attain high-quality audio transmission without harmful influence of any distortion in the recording medium. Furthermore, since the digital signal is recorded through O-QDPSK modulation with limitation of both the bandwidth and the amplitude thereof, it becomes possible to minimize the interference with the video signal while enhancing the C/N ratio of the reproduced O-QDPSK modulated signal.

Figure 9:
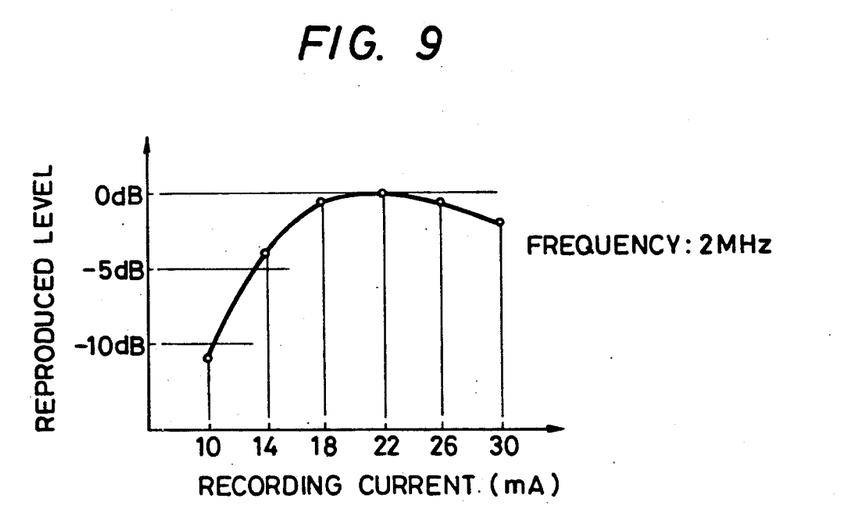
FIG. 9 graphically shows the relationship between a recording current and a reproduced output level in the characteristic of an audio head.

Hereinafter the effects of the above embodiment will be described with reference to FIGS. 9 through 11. FIG. 9 graphically shows the result of actually measuring the recording current and the reproduced output level in the characteristics of the audio-only heads 126a and 126b. Generally the magnetic head has such characteristic that, as plotted in the graph, its reproduced output increases in proportion to the recording current up to a certain level, but there exists a saturation point where the output level no further rises despite any increase of the recording current. And it is customary that the recording current is set at such saturation point for the purpose of improving the S/N ratio. However, a possibility may be induced due to the saturation that the recorded waveform is distorted to eventually generate an unnecessary spectrum which brings about interference with the video signal. Particularly in applying the QPSK system which is utilized as digital modulation in a variety of fields and is substantially equivalent to an amplitude modulation (AM) system, a side lobe comes to expand due to the saturation. In view of such disadvantage, employing the O-QPSK system is effective to minimize the amplitude variation in the recorded waveform to consequently suppress generation of any distortion that results from the saturation. And by virtue of the above-described O-QDPSK system, it is not needed to maintain the phase different $\phi$ of the recovered carrier at 0° under control, hence simplifying the demodulator circuit configuration.

For recording the PCM audio signal on a multi-layer medium without changing the frequency arrangement of the video signal used in the VTR available today, it is preferred to employ the technique of audio deep-part recording In a deep-part recording operation where the PCM audio signal is erased in the surface part of the recording medium by the video signal superposed thereon, it is necessary to raise the reproduction level of the PCM audio signal as high as possible to achieve saturation recording. As the signal is saturated in such recording and its waveform is thereby distorted, the O-QPSK system is preferred for modulation. Since in the O-QPSK system some obscurity of n×90° (n=integer) is residual in the recovered reference carrier as mentioned, differential coding is executed on the transmitter side while inverse differential decoding is executed on the receiver side so as to attain exact demodulation despite such obscurity. The above is the feature of the O-QDPSK system which is adapted to provide an optimal modulator/demodulator.

Figure 10:
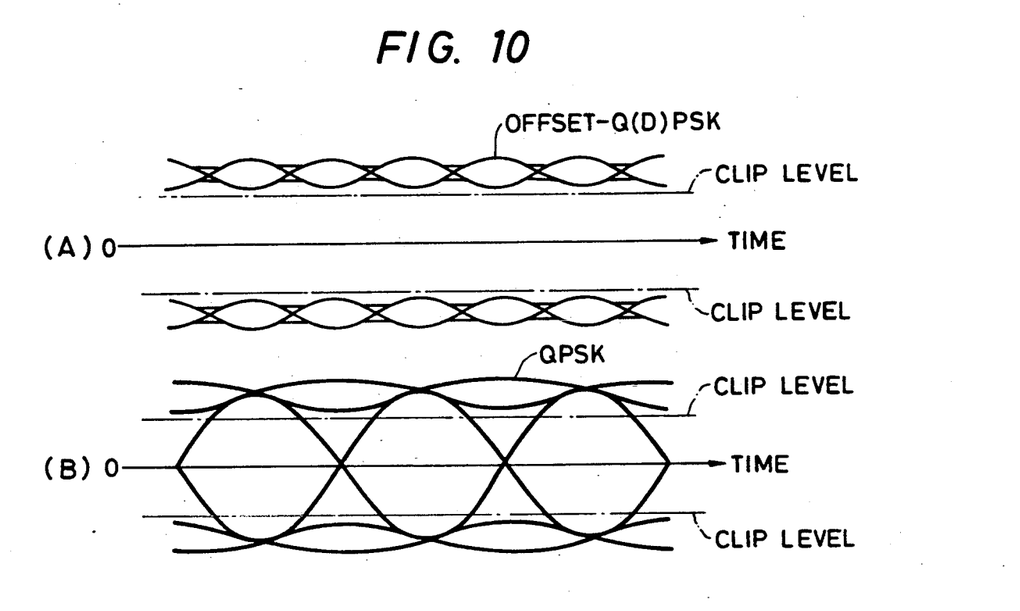
FIG. 10 is a waveform chart showing the envelopes of offset Q(D)PSK modulated waves and QPSK modulated waves.
Figure 11:
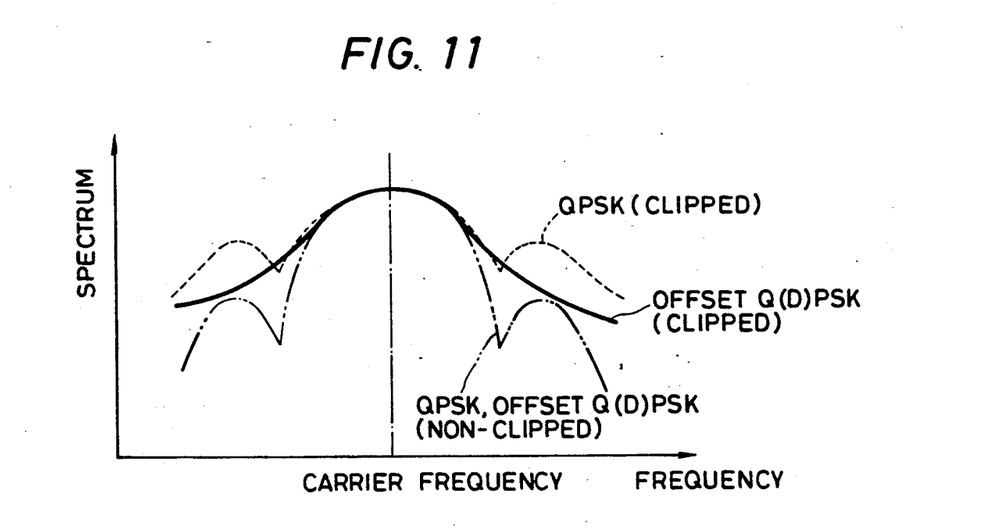
FIG. 11 graphically shows the spectrum of the offset Q(D)PSK modulated wave.

FIGS. 10 and 11 show the effects of the above-mentioned embodiment, in which FIG. 10 (A) and (B) represent the envelope of O-Q(D)PSK modulated waves and that of QPSK modulated waves, respectively. In the O-Q(D)PSK system, the amplitude variation is reduced as compared with the QPSK system. And saturation of such waveform is equivalent to clipping thereof at a certain level denoted by a one-dot chain line. FIG. 11 graphically shows the spectra obtained in such a state, wherein a solid line and a broken line respectively denote the spectrum in the O-Q(D)PSK system and that in the QPSK system. And a two-dot chain line denotes the spectrum obtained at the time of nonsaturation without clipping. In this case, the spectrum is the same in both systems. As described, the O-Q(D)PSK system is advantageous with respect to that the spectrum is kept free from expansion regardless of such clipping, and consequently interference with the video signal is substantially nil in recording the digital audio signal by the use of this system.

Figure 7:
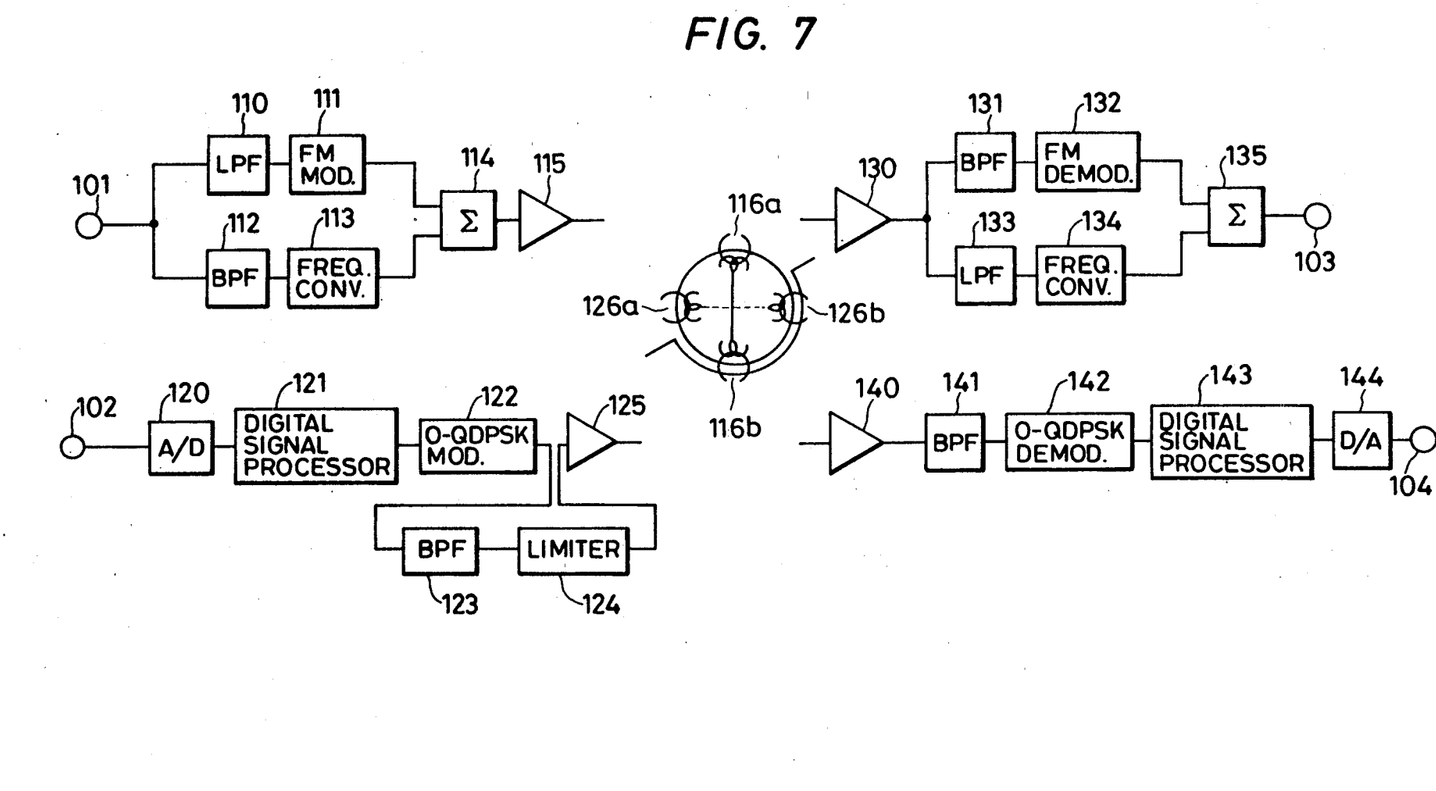
FIG. 7 is a block diagram of another embodiment of the invention in an exemplary case where the offset quadrature differential PSK modulator and demodulator thereof are applied to a digital audio magnetic multilayer recording/reproducing apparatus.
Figure 8:
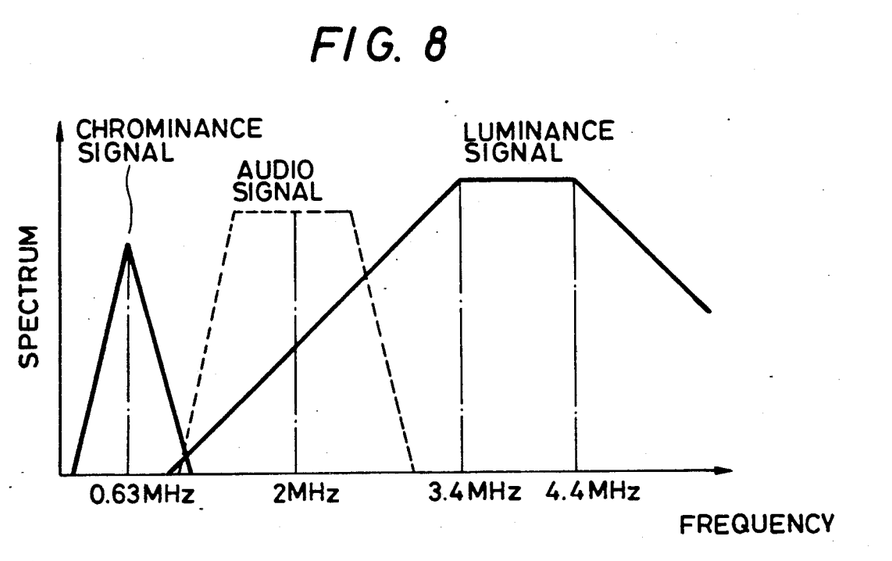
FIG. 8 graphically shows the frequency characteristics of digital audio signal and video signal recorded on a magnetic recording medium in the embodiment of FIG. 7.

In view of the fact that the spectrum is not expanded despite clipping of the aforementioned O-Q(D)PSK modulated signal, the embodiment of FIG. 7 is so contrived as to perform a recording operation with a constant amplitude through the limiter 123 to limit the amplitude variation residual in the O-Q(D)PSK modulated signal, hence accomplishing complete saturation recording to eventually improve the C/N ratio of the reproduced signal as well as to reduce the coding error rate relative to the demodulated data.

Figure 12:
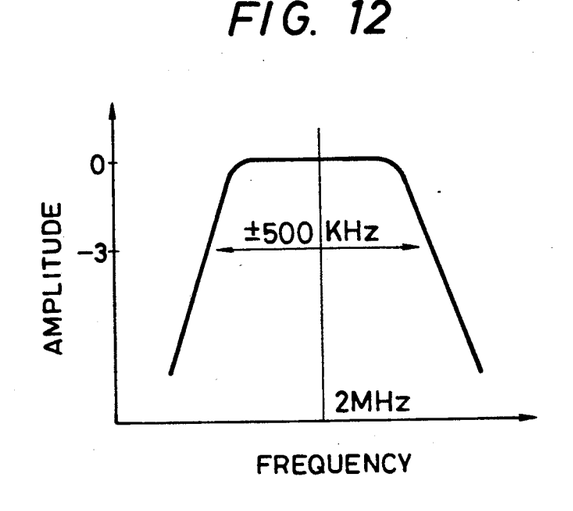
FIG. 12 graphically shows the frequency characteristic of a BFP 123 disposed on the digital audio recording side in the embodiment of FIG. 7.

FIG. 12 graphically shows exemplary frequency characteristic of the BPF 123 in the digital audio signal recording circuit shown in FIG. 7. Assuming now that the converted digital audio signal is processed at a code transmission rate of 2M bits/sec, the minimum necessary bandwidth is ±500 kHz in QDPSK modulation. In such a case, if the bandwidth of the BPF 123 is set at ±500 kHz to completely eliminate the side lobe of the modulated signal spectrum, then substantially no interference is generated with the video signal.

Figure 13:
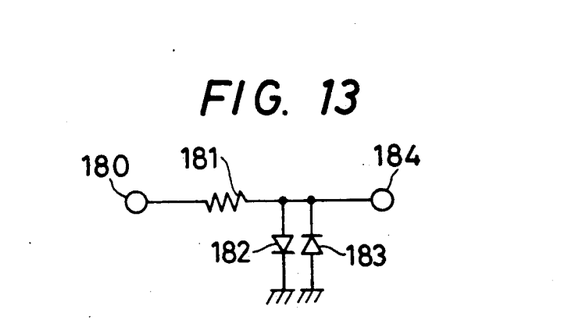
FIG. 13 is a circuit diagram showing an exemplary embodiment of a limiter 124 disposed on the digital audio recording side in the embodiment of FIG. 7.
Figure 14:
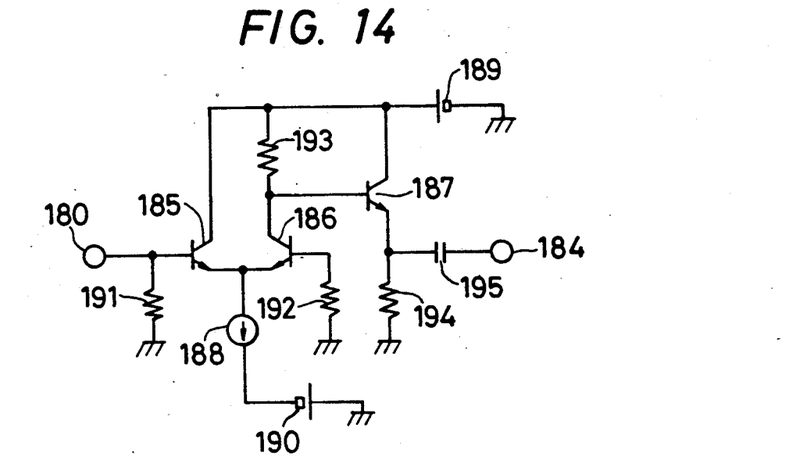
FIG. 14 is a circuit diagram showing another embodiment of the limiter 124 in FIG. 7.

FIG. 13 is an exemplary circuit diagram of the limiter 124, wherein an input signal fed to an input terminal 180 is passed through a resistor 181 and diodes 182 and 183, so that the signal amplitude is limited to the threshold voltage (about 0.7 V) of the diodes in both positive and negative polarities, and the signal thus limited is obtained from an output terminal 184. FIG. 14 is another exemplary circuit diagram of the limiter 124, wherein a differential amplifier comprising transistors 185 and 186 is employed to attain the limiter effect. Although a variety of circuit configurations may be contrived with respect to the limiter 124 as mentioned, it is not limited to the above examples alone.

In the aforesaid embodiment of the present invention shown in FIG. 7, the BPF 123 and the limiter 124 are disposed posterior to the O-QDPSK modulator 122. However, substantially the same effect as in the above embodiment can be achieved even with omission of the limiter 124 and/or the BPF 123.

As described hereinabove, a multilayer recording operation is performed in the exemplary embodiment of the present invention, wherein the video signal is composed of a frequency-modulated luminance signal and a frequency-executed by video and audio heads which are different in azimuth angle from each other. However, the feature of the above embodiment resides in extremely narrowing the occupied bandwidth of the digital audio recording signal to suppress the mutual interference with the video recording signal. Therefore, the recording mode is not restricted to such multilayer recording alone and may be ordinary multifrequency recording as well. Furthermore, in case the video signal is processed by a time-division multiplex method with regard to its luminance and chrominance signals, multifrequency recording may be executed by selectively setting the occupied band of the digital audio recording signal outside that of the frequency-modulated video signal. In another case of parallel-recording the luminance signal and the chrominance signal in individual tracks, the digital audio signal may be multifrequency-recorded in either of such tracks in a manner that the respective occupied bands are not overlapped.

What is claimed is:

1. An information recording/reproducing apparatus for recording/reproducing a digital audio signal on/from a magnetic medium, said digital audio signal being modulated/demodulated by a phase shift keying modulator/demodulator, comprising:

a serial-parallel converter for converting said digital audio signal into two parallel audio data signals Xk and Yk corresponding to even and odd bits of said digital audio signal, respectively, wherein said parallel audio data signals Xk and Yk have a relative time difference corresponding to an one half data period, where k is an integer;

first and second differential coders for coding said parallel audio data signals Xk and Yk into code data signals Pk and Qk;

a quadrature modulator for balanced-modulating two quadrature carriers using said parallel audio data signals Pk and Qk, respectively, said two quadrature carriers having a $\pi/2$ phase difference from each other and for combining said balanced-modulated quadrature carriers to produce an output;

a first magnetic recording/reproducing means for recording/reproducing said output of said quadrature modulator on/from a deep part of said magnetic medium;

a coherent detector for phase-detecting said output reproduced from said deep part of said magnetic medium by use of two quadrature carriers having a $\pi/2$ phase difference from each other;

first and second code discriminators for discriminating two outputs of said coherent detector to reproduce said code data signals Pk and Qk, respectively;

first and second differential decoders for differential decoding said reproduced code data signals Pk and Qk respectively to reproduce said parallel audio data signals Xk and Yk; and a parallel-serial converter for converting said reproduced parallel audio data signals Xk and Yk to reproduce said digital audio signal, said odd bits corresponding to said reproduced parallel audio data signal Xk and said even bits corresponding to said reproduced parallel audio data signal Yk.

2. An information recording/reproducing apparatus according to claim 1, further comprising:
a second magnetic recording/reproducing means for recording/reproducing a video signal, including a component having a frequency lower than the frequency of the output of said quadrature modulator, on/from a surface part of said magnetic medium.

3. An information recording/reproducing apparatus according to claim 2, further comprising:
a limiter for limiting said output of said quadrature modulator prior to supplying said output to said first recording/reproducing means.

4. An information recording/reproducing apparatus according to claim 3, further comprising:
a band-pass filter for band-passing said output of said quadrature modulator prior to supplying said output to said limiter.

5. An information recording/reproducing apparatus for recording/reproducing a first signal and a second digital signal on/from a magnetic medium, said apparatus comprising:
a serial-parallel converter for converting said second digital signal into two parallel data signals corresponding to even and odd bits of said second digital signal, respectively, wherein said parallel data signals have a time difference corresponding to an one half data period;
a quadrature modulator for balanced-modulating two quadrature carriers by said parallel data signals, respectively, said two quadrature carriers having a $\pi/2$ phase difference from each other and for combining said balanced-modulated quadrature carriers to produce an output;
first magnetic recording/reproducing means for recording/reproducing said output of said quadrature modulator on/from a deep part of an area of said magnetic medium;
second magnetic recording/reproducing means for reproducing/recording said first signal, including a component having a frequency lower than the frequency of said output of said quadrature modulator, on/from a surface part of said area of said magnetic medium;
a coherent detector for phase-detecting said output reproduced from said deep part of said magnetic medium by two quadrature carriers having a $\pi/2$ phase difference from each other;
first and second code discriminating means for discriminating two outputs of said coherent detector to reproduce said parallel data signals; and
a parallel-serial converter for converting said reproduced parallel data signals to reproduce said second digital signal, said odd bits corresponding to one of said reproduced parallel data signals and said even bits corresponding to another one of said reproduced parallel digital data signals.

6. An information recording/reproducing apparatus according to claim 5, further comprising:
a limiter for limiting said output of said quadrature modulator prior to supply said output to said first recording/reproducing means.

7. An information recording/reproducing apparatus according to claim 6, further comprising:
a band-pass filter for passing a frequency band of said output of said quadrature modulator prior to supply of said output to said limiter.

8. An information recording/reproducing apparatus according to claim 7, wherein:
said first signal is a video signal including a frequency-converted chrominance signal and a frequency-modulated luminance signal.

9. An information recording/reproducing apparatus according to claim 8, wherein:

10. An information recording reproducing apparatus according to claim 9, further comprising:
first and second differential coders for coding said parallel data signal into code data signals and for supplying to said quadrature modulator.

11. An information recording/reproducing apparatus according to claim 10, further comprising:
first and second differential decoders for differential decoding outputs of said code discriminators, respectively, and for supplying said outputs to said parallel-serial converter so as to reproduce said second digital signal.

12. An information recording/reproducing apparatus for multi-layer recording/reproducing a video signal including a frequency modulated luminance signal and a digital signal on/from a magnetic medium having non-linear transmission characteristics, comprising:
serial-parallel converting means for converting said digital signal into two parallel data signals corresponding to even and odd bits of said digital signal, respectively, wherein said parallel data signals have a time difference corresponding to an one half data period;
quadrature modulating means for balanced-modulating two quadrature carriers by said parallel data signals, respectively, said two quadrature carriers having a $\pi/2$ phase difference from each other and a frequency of said two quadrature carriers being lower than the carrier frequency of said frequency modulated luminance signal, such that said frequency modulated luminance signal has a predetermined frequency band and said digital signals are multiplex recorded without interference therebetween;
first magnetic recording/reproducing means for recording/reproducing said output of said quadrature modulator on/from a deep part of an area of said magnetic medium;
second magnetic recording/reproducing means for recording/reproducing said video signal, including a component having a frequency lower than the frequency of said output of said quadrature modulator means, on/from a surface part of said area of said magnetic medium;
detecting means for phase-detecting said output reproduced from said deep part of said magnetic medium by two quadrature carriers having a $\pi/2$ phase difference from each other to produce two outputs;
first and second code discriminating means for discriminating said two outputs of said detecting means to reproduce said parallel data signals; and
parallel-serial converting means for converting said reproduced parallel data signals to reproduce said digital signal, said odd bits corresponding to one of said reproduced parallel data signals and said even bits corresponding to another one of said reproduced parallel digital data signals, such that said digital signal is reproduced with less code errors.

13. An information recording/reproducing apparatus according to claim 12, further comprising:
first and second differential coding means for coding said parallel data signals into code data signals and for supplying said code data signals to said quadrature modulating means.

14. An information recording/reproducing apparatus according to claim 13, further comprising:
first and second differential decoding means for differential decoding the outputs of said code discriminating means, respectively, and for supplying said outputs to said parallel-serial converting means so as to reproduce said second digital signal.

15. An information recording/reproducing apparatus according to claim 12, wherein said first magnetic recording/reproducing means records said output of said quadrature modulating means on said area of said magnetic medium before said second magnetic recording/reproducing means records said video signal on said area of said magnetic medium.

16. An information recording/reproducing apparatus according to claim 15, further comprising:
means for limiting said output of said quadrature modulating means prior to supply of said output to said first recording/reproducing means.

17. An information recording/reproducing apparatus according to claim 16, further comprising:
bandpass filtering means for passing a frequency band of said output of said quadrature modulating means prior to supply of said output to said limiting means.

18. An information recording/reproducing apparatus according to claim 12, wherein said digital signal is a PCM audio signal.

19. An information recording/reproducing apparatus according to claim 13, further comprising:
means for limiting said output of said quadrature modulating means prior to supply of said output to said first recording/reproducing means.

20. An information recording/reproducing apparatus according to claim 19, further comprising:
bandpass filtering means for passing a frequency band of said output of said quadrature modulating means prior to supply of said output to said limiting means.

21. An information reproducing apparatus for reproducing a video signal, including a frequency modulated luminance signal having a predetermined frequency band and a digital signal, from a magnetic medium having non-linear transmission characteristics, and on which said video signal is recorded on a surface part of an area thereof and wherein said digital signal modulated by an offset quadrature phase-shift keying is recorded on a deep part of said area thereof, a carrier frequency of said frequency modulated luminance signal being higher than a frequency of two quadrature carriers of said offset quadrature phase-shift keying, and said two quadrature carriers having a $\pi/2$ phase difference from each other, such that said video signal and said digital signal are multiplex recorded without interference therebetween, said apparatus comprising:
first magnetic reproducing means for reproducing said modulated digital signal from said deep part;
second magnetic reproducing means for reproducing said video signal from said surface part; detecting means for phase-detecting said modulated digital signal reproduced by said first magnetic reproducing means by said two quadrature carriers to produce two outputs;
first and second code discriminating means for discriminating said two outputs of said detecting means, respectively, to produce two code data signals; and
parallel-serial converting means for converting said two code data signals to said digital signal, said odd bits corresponding to one of said two code data signals, and said even bits corresponding to another one of said two code data signals, such that said digital signal is reproduced with less code errors.

22. An information reproducing apparatus according to claim 21, further comprising:
first and second differential decoding means for differential decoding the outputs of said code discriminating means, respectively, and for supplying outputs to said parallel-serial converting means, wherein said offset quadrature phase shift keying is an offset quadrature differential phase shift keying.

23. An information reproducing apparatus according to claim 22, wherein said digital signal is a PCM audio signal.

24. An information recording/reproducing method for recording/reproducing a video signal including a frequency modulated luminance signal having a predetermined frequency band
and a digital signal on/from a magnetic medium, said method comprising the steps of:
modulating said digital signal by offset quadrature phase shift keying modulation, a frequency of two quadrature carriers of said modulation being lower than a carrier frequency of said frequency modulated luminance signal, such that said frequency modulated luminance signal and said digital signal are multiplex recorded without interference therebetween;
recording/reproducing said modulated digital signal on/from a deep part of an area of said magnetic medium;
recording/reproducing said video signal on/from a surface part of said area of said magnetic medium; and
demodulating said modulated digital signal reproduced from said deep part of said magnetic medium by said two quadrature carriers to reproduce said digital signal, such that said digital signal is reproduced with less code errors through said magnetic medium having non-linear transmission characteristics.

25. An information recording/reproducing method according to claim 24, wherein said modulation is an offset quadrature differential phase shift keying modulation.

26. An information recording/reproducing method according to claim 24, wherein said digital signal is a PCM audio signal.

27. An information reproducing method for reproducing a digital signal and a video signal including a frequency modulated luminance signal and a frequency modulated chrominance signal having predetermined frequency bands, said method comprising the steps of:
reproducing said digital signal from a magnetic recording medium on which said video signal is recorded on a surface part of an area thereof, said digital signal being modulated by offset quadrature phase shift keying modulation and recorded on a deep part of said area, a frequency of two quadrature carriers of said offset quadrature phase shift keying modulation being lower than said carrier frequency of said frequency modulated luminance signal and higher than said carrier frequency of said frequency modulated chrominance signal, such that said video signal and said digital signal are multiplex recorded without interferences therebetween;

reproducing said video signal from said surface part of said magnetic recording medium;

demodulating said modulated digital signal reproduced from said deep part of said magnetic recording medium by said two quadrature carriers to reproduce said digital signal, such that said digital signal is reproduced with less code errors through said magnitude recording medium having non-linear transmission characteristics.

28. An information reproducing method according to claim 27, wherein said modulation of said digital signal is an offset quadrature differential phase shift keying modulation.

29. An information reproducing method according to claim 27, wherein said digital signal is a PCM audio signal.

30. A method for recording a digital information signal with a video signal on a magnetic medium, comprising the steps of:

offset QPSK modulating a carrier with said digital information signal to produce a modulated signal;

recording said modulated signal produced by said offset QPSK modulating in a deep layer of said magnetic medium using a first pair of magnetic heads; and recording said video signal, including a component having a frequency lower than the frequency of said modulated signal, in a surface layer of said magnetic medium using a second pair of magnetic heads whose azimuth angles are different from those of said first pair of magnetic heads, after recording the modulated signal.

31. An apparatus for recording a digital information signal with a video signal on a magnetic medium, comprising:

offset QPSK modulating means for modulating a carrier with said digital information using offset QPSK modulation;

first recording means for recording the modulated signal from said offset QPSK modulating means in a deep layer of said magnetic means; and second recording means for recording said video signal, including a frequency component lower than the frequency of said modulated signal, in a surface layer of said magnetic medium, after recording the modulated signal.

* * * * *